July 13, 1965  J. J. L. MA ET AL  3,194,643
CLAD METAL PRODUCT

Filed July 20, 1962  6 Sheets-Sheet 1

INVENTORS
JAMES J. L. MA
CHARLES WRIGHT, JR.
KENNETH W. MC EUEN

BY Mason, Mason & Albright
ATTORNEYS

July 13, 1965

J. J. L. MA ET AL 3,194,643

CLAD METAL PRODUCT

Filed July 20, 1962

Inventors
JAMES J. L. MA
CHARLES WRIGHT, JR.
KENNETH W. MC EUEN

By Mason, Mason & Albright
Attorneys

Inventors
JAMES J. L. MA
CHARLES WRIGHT JR.
KENNETH W. MC EUEN

July 13, 1965 J. J. L. MA ET AL 3,194,643

CLAD METAL PRODUCT

Filed July 20, 1962 6 Sheets-Sheet 5

Inventors.

JAMES J. L. MA
CHARLES WRIGHT JR
KENNETH W. MC EUEN

By Mason, Mason & Albright
Attorneys

Inventors
JAMES J. L. MA
CHARLES WRIGHT, JR.
KENNETH W. MC EUEN

United States Patent Office 3,194,643
Patented July 13, 1965

3,194,643
CLAD METAL PRODUCT
James J. L. Ma, West Chester, Charles Wright, Jr., Coatesville, and Kenneth W. McEuen, Malvern, Pa., assignors to Lukens Steel Company, Coatesville, Pa., a corporation of Pennsylvania
Filed July 20, 1962, Ser. No. 211,375
8 Claims. (Cl. 29—191)

This invention relates to a new process for producing clad metals. More specifically, the invention embraces a process by which similar and dissimilar metal sheets, slabs or plates may be united by successive steps including an initial mechanical or intermittent metallurgical bonding using a high-energy rate source followed by a metallurgical bonding over their entire contacting juxtaposed surfaces.

Clad metals comprise a base metal which, such as mild steel, is not usually overly expensive, together with a second metal which possesses certain desirable characteristics, such as high resistance to corrosion or oxidation not possessed by the base metal. The second layer may be stainless steel, nickel, titanium, aluminum, or any number of other metals, alloys or suitable compositions known to those skilled in the art. Generally, the second metal is relatively thin in comparison with the base metal, although this is not always the case.

A number of different procedures exist for producing clad metals which each present certain advantages and disadvantage. Clad metals may generally be divided into three categories. One of these consists of a comparatively thin coating over one or more surfaces of the base metal. In to this category falls the process of "hot dipping" (as illustrated by galavanizing), electroplating chemical plating as used for mirrors and the like, and vapor deposition.

A second category is that of electric weld deposition providing continuous coverage on the base metal surfaces. Although this application has found certain widespread use, it has inherent limitations which restrict its usefulness.

The third process which is more extensively used consists of laminating one metal upon another under various combinations of heat and pressure, as may be obtained in a rolling mill or in a press or by applying vacuum to the assembly. There are, however, certain serious limitations in this process. Elaborate, carefully sealed and strongly welded airtight packs have to be prepared for some combinations of materials which may include an inert atmosphere or a vacuum in order to prevent oxidation or other chemical reaction on the surfaces before they are bonded. As the thickness of one or both of the metals to be bonded increases, the heat and pressure method of bonding becomes more difficult. For example, it has been found difficult to produce a satisfactory clad plate with a final gage in excess of five inches of thickness, depending upon the combinations of materials involved. Moreover, in the heavier gages of clad plates, machining of the backing steel is required to insure adequate bonding. In addition, the process is frequently complicated and cumbersome with certain combinations of metals, such as, for example, copper alloys on steel and with titanium cladding, which adds to the ultimate cost of the product.

At times, several of the above methods may be combined to produce a superior product. For example, the vaporization and plating processes are sometimes used together and it is now not uncommon to electroplate a metal to be bonded by heat and pressure with a thin layer of metal in order to protect the surface and to control, within limits, the interlayer alloy.

It has been known for some time that one metal can be bonded to another by the application of one metal against another whereby they impact at a high velocity. The pressure in the impact area creates for a small but finite time thin layer of molten solids in the contacting surfaces of metals which tend to alloy and form an initial intermittent metallurgical bond. In consequence, it occurred to the inventors that it might be possible to employ high-energy rate means such as obtained by the use of chemical explosives to clad one metal on another with a sufficient bond so that the necessity of making a strong, well-sealed pack before heating and rolling could be eliminated. Subsequent application of this concept on metal bonded by chemical explosive techniques developed by others has shown that it is indeed possible to obtain a clad metal plate product by such a process which is comparable in quality to that manufactured by current known processes.

In addition, the process permits the obtention of a variety of satisfactory clad products having an over-all thickness substantially exceeding five inches. Heretofore, this was commercially unpracticable with certain types of steel backing plates.

Techniques of cladding by chemical explosives are relatively new and, aside from the initial conception of the combination use of explosive cladding with heat treatment and reduction in thickness or either and as disclosed and claimed herein, no claim of invention is made for such techniques per se. For disclosure of processes for cladding by explosives, attention is invited to: Belgian Patent No. 599,918, of C. R. Cowan, J. J. Douglass, and A. H. Holtzman; "How Explosives Weld Metals," The Iron Age, May 4, 1961, page 83, and "Explosive Welding," Research For Industry, Stanford Research Institute, vol. 14, No. 1, January–February 1962, page 10. It will be noted from the foregoing disclosures that the bond formed in explosive cladding has a characteristic wavy appearance. Since, in most cases, the bond created by the explosive process is not comparable to that of the hot rolled clad plate, it is to be understood that the process herein disclosed produces a new and beneficial article having commercial practicality.

An object of this invention is the production of clad metal plate by a process which includes the successive steps of initial mechanical or intermittent metallurgical bonding or both using a high-energy rate source followed by metallurgical bonding.

A further object of this invention is a new method of bonding metal pieces having dissimilar characteristics to each other, such as a stainless steel sheet or plate to a carbon steel plate—with or without intermediate surface treatment such as nickel or iron plating, or the insertion of a nickel, iron or other metallic intervening layer between the metal sheets or layers.

A further object is the production of clad plates whereby said plates may be composed of various dissimilar metals, such as different types of steels, steel alloys, nickel and nickel alloys, brasses and bronzes, initially bonded by an explosive charge, and whereby the initial bond resulting from the explosive bonding step is transformed to a metallurgical bond, waviness at the bond interface is reduced, and strains due to cold work are eliminated by subjecting the initial composite metal to hot working operation or heat treatment; a composite thereby being produced which is comparable to a clad plate produced by heat and pressure methods.

A yet further object is to combine in a single process the steps of explosively bonding a backing metal with a cladding followed by metallurgically uniting the backing metal and cladding by heat and pressure to relieve the strains of cold work in the cladding and backing metal resulting from the high-energy shocks set up in the metals during the explosive bonding step of the process. In the explosively bonded condition, the cladding is frequently very brittle and unable to withstand normal bending in fabrication. But after the heating, or heating and pressure, the cladding becomes ductile to the point where bending tests may be performed without cracking the cladding and the product is commercially practicable.

Further objects are the substantial closing of any voids and porosities at the bond zone, and reduction of waviness at the interface after the explosive bonding of cladding to a backing plate, by the heating and pressing steps. Should the heating, or heating and pressing steps be omitted, these voids and porosities tend to open up and cause separation of the cladding from the backing plate or detrimental cracking in the bond zone during subsequent fabrication, such as hot or cold bending or welding. It has been ascertained that the heating and rolling steps following the explosive bonding step prevent failure and separation or cracking during routine bending incident to fabrication.

Another object is to economize on the use of explosives during the explosive bonding step. Since the cost of the explosive operation required increases in a manner proportional to the bonding surface area increase, there is a considerable cost saving when bonding in slab form followed by hot reduction. Moreover, the operational hazards in handling large quantities of explosives are proportionately reduced.

The invention, however, is not limited to bonding in slab form, followed by heat and pressure, although the method preferably includes such, inasmuch as annealing or normalizing may be used in some cases. It is, however, to be appreciated that, although ductility is restored by such heat treatments as annealing or normalizing, the presence of voids at the bond line still makes such treatments inadequate for many applications, especially where the base layer is of substantial thickness.

Yet another object is to provide roll bonding by heat and pressure of clad plates composed of various metals, such as steels, stainless steels, nickels, nickel alloys, copper, copper alloys, brasses and bronzes, with or without an intermediate layer. These metals are bonded together initially by an explosive charge and are later metallurgically bonded by the application of heat and reduction. It has been determined that the physical and metallurgical properties of such explosively bonded metals are materially improved by heating to rolling temperature, then rolling on a plate mill, or heating and hot pressing. The temperature range for this work is approximately 1700° F. minimum to 2300° F. maximum when using a stainless steel cladding and a low-carbon steel backing plate. When using copper or copper alloy cladding, the temperature range is 1450° F. to 1750° F.

Some improvement in the properties of the bond produced by the explosive discharge can be obtained by subsequently annealing at approximately 1750° F. to 2100° F. for the combination of most stainless steels on a carbon steel backing plate, although this heat treatment does not approximate the improvement in the bond which is obtained by hot working as noted above. Appropriate temperatures for other combinations of claddings on carbon steel will provide a comparable type of improvement. For example, titanium bonded to carbon steel has its ductility improved by annealing at 1200° F. to 1650° F.

Other objects will appear hereinafter throughout the specification.

Figure 1:
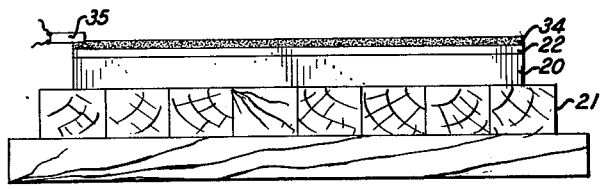
FIGURE 1 is a side view of an assembly to produce an explosively bonded clad.
Figure 2:
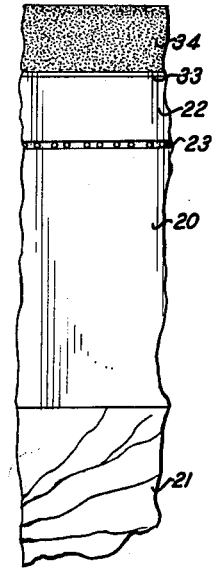
FIGURE 2 is an enlarged detail of the assembly shown in FIGURE 1 to show the various layers.

To produce the explosive clad, a base metal 20 is placed upon a flat support 21 which may be made of dunnage, plywood, hard gypsum cement, or other suitable material. The base metal 20 is preferably in its most ductile condition, which may be accomplished by prior suitable heat treatment. The upper surface of the base metal 20 is cleaned to remove oxides and a cladding metal sheet 22 is placed thereover. The lower surface of the cladding metal sheet 22 is also cleared of oxides. The base metal 20 is separated from the cladding metal sheet 22 by a small distance to enable the cladding metal sheet to gain the appropriate movement when propelled by the explosive, so that the impact is most effective. When working in atmosphere, this distance should generally be between one-thousandth of an inch and one-half of an inch, with the uniformity of the gap closely controlled. In a partial or substantially full vacuum, the distance may be increased. Separation of the layers may be accomplished by means of a dividing powder, which may be particles of iron powder 23 (see FIGURE 2) of an appropriate size as indicated in Belgian Patent No. 599,918, or by other suitable spacing devices placed around the periphery of the cladding assembly.

The surface of the base metal 20 to be cladded may also be suitably conditioned as by grit blasting to produce a roughened surface to provide a proper surface texture.

Over the cladding metal sheet 22 is placed a protective found of any contamination by oil or grease, it is completely removed with an organic solvent to avoid carbonization of the cladding during heat treatment, and the backing steel face is painted with the chrome-based coating mentioned above. This is to avoid the formation of alligator scale during the final annealing heat treatment which is generally conducted in a car-bottom furnace. For Type 304 stainless steel, the clad plate is heated to approximately 1950° F. and held at such temperature until uniform. As the plate is discharged from the furnace, it is rapidly cooled in moving air. The annealed plate is then flame descaled, sodium hydrided and pickled. In the as-pickled condition, the clad plate is flattened on a roller leveler. Finally, following gage measurements, inspection, and tests, the plate is sheared or flame cut to pattern size for shipment.

The following examples illustrate composites which were fabricated by the method of the instant invention. It is, however, to be understood that they are illustrative only and not exhaustive or limiting, and do not cover the full range of sizes, gages, and types tested:

*Example I*

Figure 6:
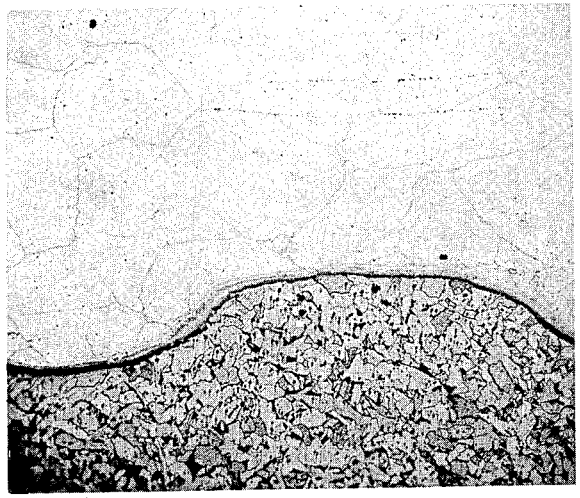
FIGURE 6 is a microphotograph showing the bond zone of an explosively bonded stainless clad steel which has been reduced 44% by hot pressing, the same being a section parallel to the propagation of the shock wave.
Figure 14:
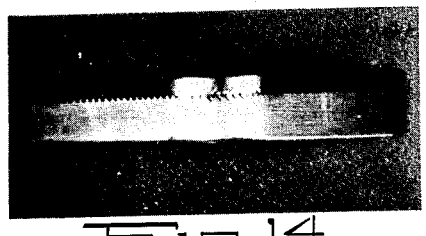
FIGURE 14 shows an explosively bonded structure which has been subjected to the side bend test.
Figure 15:
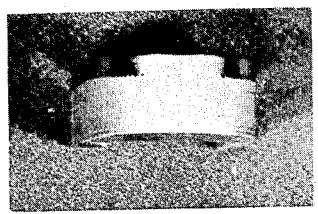
FIGURE 15 is a similar view of an explosively bonded structure subjected to a side bend test after annealing.
Figure 16:
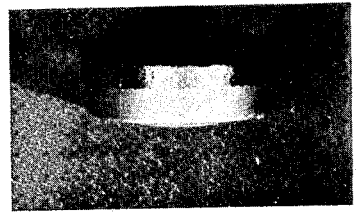
FIGURE 16 is a photograph of material which has been hot reduced after explosive bonding, and which has been subjected to a side bend test.

A clad plate was produced by explosive bonding which comprises a backing plate of ASTM designation: A–201 Grade A carbon steel 6″ x 6″ x 4″ with a cladding ½″ thick Type 304 extra-low-carbon stainless steel. The clad plate was placed in a furnace, where it was heated to 2250° F. for a period of two hours. It was then transferred to a 1200-ton hydraulic press, where it was compressed approximately ⅜″ in thickness. Thereafter, the assembly was pressed a second, third and fourth time with a step of heating to 2250° F. preceding each pressing. The total reduction was about 44% of the initial gage. Following the reduction operations, the clad was annealed. Shear strength specimens representing both the as-pressed and annealed conditions were prepared and tested. After pressing, the shear strength averaged 39,540 p.s.i., while after annealing the shear strength increased to an average of 48,355 p.s.i. One specimen was bent with the bond zone in shear and no cracks were found at the bond zone. FIGURE 14 shows a side bend test of an explosively bonded clad plate without heat and pressure treatments. Although the specimen was not bent the entire 180°, it is to be noted that separation of the clad from the base metal had already commenced. FIGURE 15 shows a test specimen which was annealed, and FIGURE 16 is a test specimen following hot pressing with 44% reduction. Metallographic examination of a specimen in the as-pressed condition discloses that the amplitude of the waviness has been decreased and the crest-to-crest distance has been increased. This can be readily seen with reference to FIGURE 4, which shows a typical wave after explosive bonding in contrast with FIGURE 6 showing a bond wave following hot reduction. The voids at the bond zone noted before in the as-clad condition have nearly been closed.

*Example II*

A clad plate was produced by explosively bonding a 48″ x 40″ x ¼″ gage Type 304L stainless steel plate to a 4″ gage A–201 Grade A backing steel slab of the same size. The clad was firmly bonded, except for one small loose strip about ½″ to 1½″ wide running along one 40″ side and another small loose area on the opposite side of the slab. The composite slab was brought to a temperature of 2150° F. in a period of seven hours and held at this temperature for two hours. The temperature was raised to 2200° F. for about a half hour before drawing the slab for rolling. The first reduction passes in the rolling mill were ¼″, with subsequent passes of ½″ maximum. The over-all dimensions of the as-rolled plate were 108″ long x 66.3″ wide x 1.13″ thick. The cladding, however, did not spread as far as the backing steel and measured about 102″ x 63″. Following the rolling operations, the plate was annealed one hour at 1950° F. and cooled in moving air. Thereafter, the plate was descaled in sodium hydride and acid pickle line by the standard procedure for stainless clad plates and flattened on a roller leveler in the as-pickled condition. Tests showed that variations in both the cladding thickness and total plate thickness were within satisfactorily close limits. Ultrasonic inspection did not reveal any areas of loose clad and indicated that the plate has 100% bond. The as-rolled edges where trimmed off by powder flame cutting to yield a plate 90½″ x 60½″ x 1¼₁₆″ and four 18″ x 2″ x 1¼₁₆″ specimen for mechanical testing.

Specimens for shear test were selected from the material trimmed off the slab before rolling, from the plate as rolled, and after annealing. Some of the samples were annealed in the laboratory before preparation of the standard shear specimens. The shear strength of the as-bonded specimens was considerably higher than that of the annealed specimens, i.e., around 52,200 p.s.i. as bonded and 35,000 p.s.i. annealed without appreciable difference between the mill-annealed and the laboratory-annealed specimens. The shear strengths of all of the annealed samples were substantially in excess of ASTM's minimum requirement of 20,000 p.s.i. and were comparable to regular stainless clad steel bonded products. Specimens prepared from the plate were bent in various directions relative to the clad face. In specimens in the as-rolled and annealed conditions, very small openings or cracks less than ¼₁₆″ in length appeared at the bond line where the specimens were bent with the cladding in tension or shear. Such are, however, allowable by ASTM–ASME specifications. Specimens cut from the end of the slab from which the explosive was ignited had a somewhat finer wave pattern than specimens cut from the other end. Rolling greatly reduced the degree of waviness found at the bond line. Voids were greatly reduced in size and were generally closed.

An annealed specimen tested for corrosion resistance in accordance with ASTM designation: A–262–55T exhibited an average corrosion rate of 0.00105″ per month, which is within the accepted standard of 0.0015″ per month for comparable material.

The mechanical properties of the annealed plate met the requirements of the ASTM–A–264 specification, which states that the mechanical properties of the composite plate "shall be equal to or greater than the minimum requirements for the backing steel used." The yield strength was 41,700 p.s.i.; the tensile strength, about 68,500 p.s.i.; and the elongation percent in eight inches was 25.

*Example III*

A clad plate was produced by an explosive bonding which comprised a backing plate of ASTM designation: A–387 Grade D Firebox, 76″ x 52″ x 4⁹⁄₁₆″ and a cladding of Type 321 stainless steel ⁷⁄₁₆″ thick plated with nickel to a thickness of about 6 mils on the interface side to make a composite assembly 5″ thick. This was heated to 2150° F. for two-and-a-half hours. The composite assembly was initially rolled on the mill to 111″ x 65″ x 2½″. A section 70″ x 65″ of this plate was again heated and further reduced to produce a plate 150″ x 100″ x ¾″. Both rolled plates were heat treated and annealed in a manner similar to Example II. The bond strength, tensile strength, ductility, and corrosion resistance properties all compared favorably with conventionally produced clad plate of the same type in both gages.

The clad product of each of the foregoing examples has a superiority due to the interlocking waves at the clad interface, which contribute to the product's shear strength. This contribution continues in significant degree, even though the waves are reduced and metallurgical bonding is effected by hot reduction steps. Reduction of the crest-to-trough distance is desirable to enable satisfactory welding of the clad with conventional fabrication techniques.

With the foregoing process and such modifications as layer 33 (see FIGURE 2) of paper, plastic or other suitable material which will protect the upper cladding metal sheet 22. The explosive layer 34 is placed over the protective layer 33 and an igniter 35 is appropriately placed at one end or at one corner or at some other desired starting location of explosive layer 34.

The entire assembly is normally confined for the purposes of safety, and the operation takes place in a reasonably isolated area.

Chemical explosives found acceptable in this process may consist of a uniform, flexible sheet of 20% pentaerythritol tetranitrate (PETN), 70% red lead, and 10% binder of one-half butyl rubber and one-half thermoplastic terpene resin (commercially available as "Piccolyte" S–10, manufactured by Pennsylvania Industrial Chemical Corporation); granular TNT, or, by way of example, the flexible sheet of explosive designated as the E1–506 series by E. I. du Pont de Nemours & Co., Inc. According to Belgian Patent No. 599,918, the detonation velocity should not be greater than approximately 120% of the velocity of sound in the metal of the assembly having the higher speed of sound. However, for the necessary energy, it is also indicated in the same Belgian patent that the detonation velocity should be at least 1200 meters per second. However, a detonation velocity of between about 20,000 and 80,000 feet per second has been found acceptable for explosive welding disclosed in Patent No. 3,024,526 of March 13, 1962. For the purposes of our process, any detonation velocity that initially bonds the metals with a mechanical or intermittent metallurgical bonding over substantially the whole area involved is satisfactory.

Figure 3:
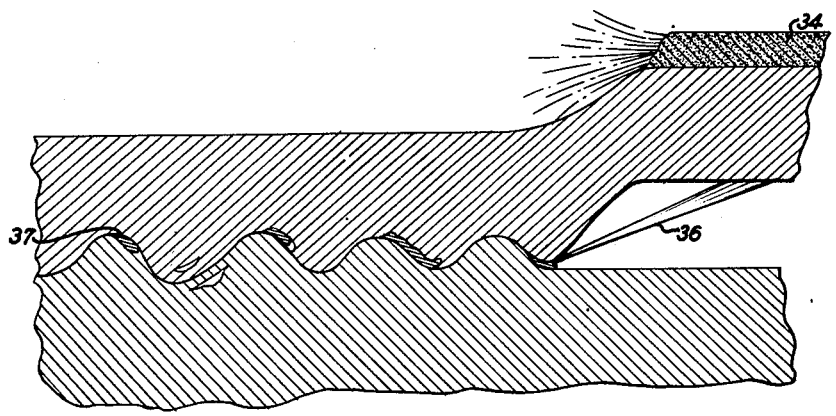
FIGURE 3 is a sectional schematic depiction of the phenomenon believed to occur in the course of the explosive cladding.
Figure 4:
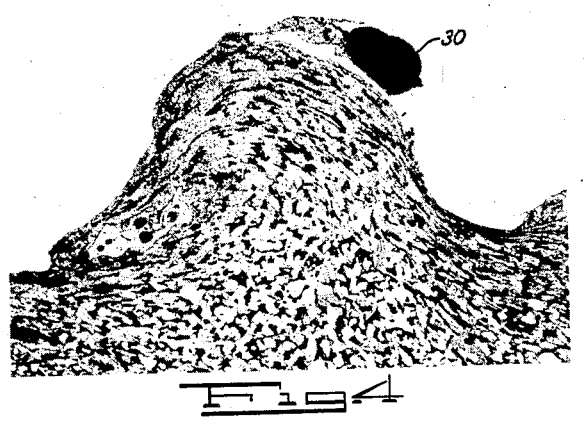
FIGURE 4 is a microphotograph showing the bond line of an explosively bonded assembly of stainless clad onto carbon steel etched in Nital, the same being a section parallel to the propagation of the shock wave.
Figure 5:
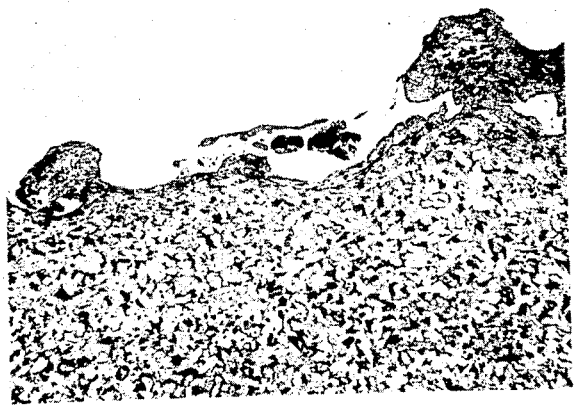
FIGURE 5 is a showing similar to FIGURE 4, the same being a section perpendicular to the propagation of the shock waves.
Figure 11:
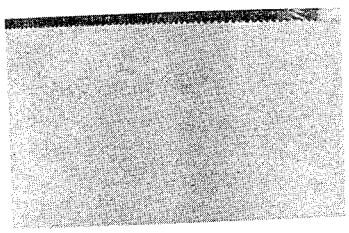
FIGURE 11 is a photograph of a section of the clad shown in FIGURE 10 parallel to the propagation of the shock wave.
Figure 12:
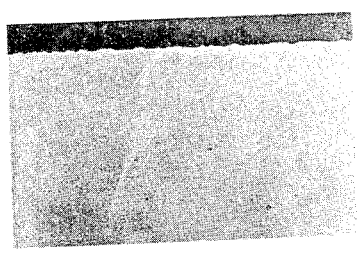
FIGURE 12 is a photograph of a section of another explosively bonded one-half-inch stainless steel clad on a steel backing plate perpendicular to the propagation of the shock wave.
Figure 13:
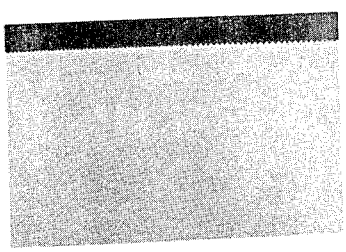
FIGURE 13 is a photograph of a section of the clad shown in FIGURE 12 parallel to the propagation of the shock wave.

One theory of operation of the explosive bonding may be described with reference to FIGURE 3. When the explosive layer 34 is ignited, the detonation travels through the explosive layer at the velocity determined by the velocity of the explosive layer 34. The pressure wave of the detonation progressively slaps the cladding metal sheet 22 against the base metal 20, and it is believed that a jet 36 composed of molten surface layers of the uniting metals builds up which cleans the metal in front of the wave and contributes to the union of the metal behind the wave. It is also believed that the metal in the impact zone is worked by the vibration and pressure waves incident to the impact, thus creating the wave effect in the bond. This wave effect may be seen in FIGURES 11 and 13. FIGURE 4 shows a single wave in cross-section prior to hot pressing, and FIGURE 6 shows a single wave after hot pressing. It will, of course, be appreciated that there is no intention to be bound by the above theory of operation.

The characteristics of the explosive bond are as follows: (1) the two cladding components are principally joined initially by a mechanical interlocking of the two metal surfaces interspersed by an intermittent fusion of the contact surfaces of the cladding at areas 37, which are thin in cross-section and were fused by the heat generated by the impact of the metal surfaces; (2) a phenomenon accompanying the fused areas between the cladding and backing plate is the presence of cavities 30 formed by shrinkage during freezing of portions of the metal surfaces from liquid to solid phases; (3) the bond line, parallel to the direction of movement of the blast wave, appears as a sinusoidal wave which progressively increases in amplitude and decreases in frequency as the distance from the point of ignition is increased; (4) both the cladding and backing components adjacent to the bond line are severely cold worked; and (5) the explosively bonded plate is brittle in the areas adjacent to the bond.

Figure 7:
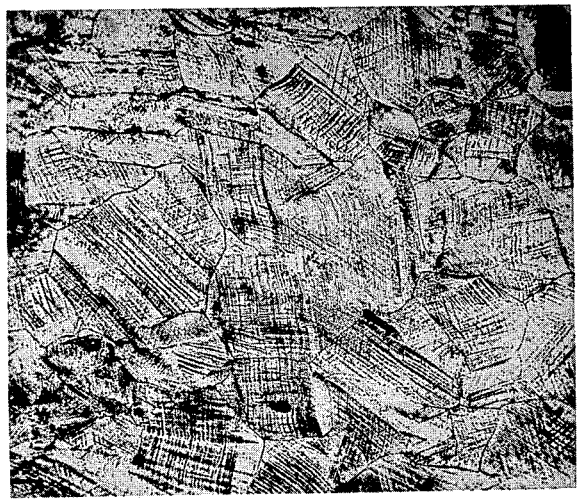
FIGURE 7 is a microphotograph of Type 304 stainless steel cladding near the surface of an explosively bonded slab which has been sensitized and etched in a 10% solution of sodium cyanide.

The bond strength of the explosively bonded stainless clad steel may average over 40,000 p.s.i. However, the bend ductility is poor because the bond is principally of an intermittent metallurgical nature, with voids acting as stress raisers. The reduced ductility, because of the cold-work structure of the metals as found at the bond line, is evident by the strain lines shown in FIGURE 7. These properties make the explosively bonded clad plate unsuitable for most pressure vessel applications and most other types of work. It is also to be noted that many stainless steels and other materials used for cladding have their corrosion resistance altered and generally diminished when they are in a similar cold-worked condition.

Figure 8:
FIGURE 8 is a microphotograph of Type 304 stainless steel cladding near the surface of an explosively bonded slab which has been normalized, sensitized, and etched in a 10% solution of sodium cyanide.
Figure 9:
FIGURE 9 is a microphotograph of Type 304 stainless steel cladding near the surface of an explosively bonded slab which had been annealed, sensitized, and etched in a 10% solution of sodium cyanide.
Figure 10:
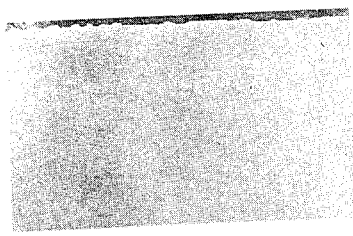
FIGURE 10 is a photograph of a section of explosively bonded one-fourth-inch stainless steel clad on a steel backing plate perpendicular to the propagation of the shock waves.

The explosively bonded clad plate produced by the foregoing process may be treated by annealing or normalizing. This relieves the strains of cold work and permits 180° side bends (see FIGURE 15). Corrosion resistance is returned to the condition normally expected for the metal after normalizing or annealing. Reduction of the strain lines due to cold work by annealing is shown in FIGURE 9 and by normalizing in FIGURE 8, in contrast with the strain lines in the cold-worked material shown in FIGURE 7. However, although ductility is partially restored by such heat treatment, the presence of voids such as indicated at 30 in FIGURE 4 renders the product inadequate for many applications.

The importance of heating, forging or rolling and conditioning following the explosive bonding cannot be overemphasized. In practice, the process consists of initially joining a layer of corrosion-resistant metal to a slab of carbon or low-alloy steel using the above-described explosive bonding mechanism. The resultant composite slab is then ultrasonically inspected for unbonded or partially bonded areas. Any loose cladding found near the edge of the slab is mechanically removed, and a weld is placed around the periphery of the slab at the interface between the cladding and the backing steel. The purpose of the peripheral weld, or "tie-in," as it is generally known in the art, is as a safety measure to minimize any damage to the rolls should the cladding open during subsequent rolling.

Prior to heating, the cladding surface of the slab is painted with a protective coating, such as the chrome-based coating disclosed in United States Patent No. 2,943,961, to reduce oxidation and surface contamination during heating. The exposed face of the carbon steel backing plate is conditioned by either grit blasting or grinding to remove obvious irregularities, such as rolled-in scale, scabs, seams, etc. The slab is then placed in a heating furnace with the clad surface next to the wall. The furnace temperature for Type 304 stainless steel clad slabs is approximately 1500° F. when charged, and the temperature of the slab is raised at a rate of roughly 100–200° F. per hour until 2150° F. is reached. The slab is soaked at this temperature for a period of roughly 15 minutes per inch of thickness, following which the temperature is raised to 2200° F. for about 30 minutes prior to rolling.

When the slab reaches the rolling mill, the clad side is face down and the slab is oriented so that any known loose cladding area around the periphery will enter the mill last. It will be appreciated that because of the differences in the coefficient of thermal expansion of the cladding and backing steel, the clad slab tends to bow. For this reason, the draft or roll opening of the mill is set initially high to allow at least two or three levelling passes before any reduction is attempted. The first two reduction passes are usually maintained at ¼ inch or less, but subsequent reductions can be increased to ½ inch maximum per pass until the final gage of the plate is reached. In a typical rolling schedule, a clad slab of approximately 4 inches in thickness is reduced to 1.18 inches in thickness in sixteen passes. In the course of the process, the slab is turned 90° at approximately the seventh pass after 1½ inches or so of reduction, and again at about the eleventh pass after 2¾ inches, more or less, of reduction.

Following rolling, the plate is allowed to cool either in air or in sand, depending on the composition of the backing steel used. As the plate cools down sufficiently, it is measured and properly identified. If evidence is will occur to those skilled in the art, stainless steel may be bonded to carbon or low-alloy steels. Although the insertion of intermediate iron or nickel by plating or otherwise is not necessary, metallurgically an improved product results. Nickel or nickel alloy foil may be used in lieu of the nickel plating, but the latter is preferred in the present state of the art.

While several embodiments of the invention have been disclosed, it is to be understood that the inventive concept is not limited by the details of structure and method described, but is capable of other adaptations and modifications within the scope of our following claims of what is considered new and patentable.

We claim:

1. A clad metal product of a base metal plate and a clad metal sheet, the juxtaposed surfaces of said plate and sheet being initially intermittently bonded by a high energy rate source, the uniting interfaces of said plate and sheet including a plurality of intermeshing waves, said plate and sheet being subsequently metallurgically bonded over the entire area of said juxtaposed surfaces with the amplitude of the intermeshing waves reduced.

2. The clad metal product according to claim 1 wherein a thin metal interlayer is included between said plate and sheet, the uniting interfaces of said plate, sheet and interlayer including a plurality of intermeshing waves.

3. A clad metal product according to claim 1, wherein said sheet is composed of stainless steel and said base plate is composed of low-carbon steel.

4. A clad metal product according to claim 1, wherein said sheet is composed of nickel and said base plate is composed of steel.

5. A clad metal product according to claim 1, wherein said sheet is composed of an alloy metal selected from the group consisting of brass and bronze and said base plate is composed of steel.

6. A clad metal product according to claim 1, wherein said sheet is composed of a metal selected from the group consisting of titanium and zirconium, and said base plate is composed of steel.

7. A clad metal product according to claim 1, wherein said sheet is composed of a metal selected from the group consisting of aluminum, nickel, nickel alloys, copper, and copper alloys.

8. A clad metal product according to claim 1, wherein said base plate is composed of a metal selected from the group consisting of carbon steels, low-alloy steels, stainless steels and nickel alloys.

References Cited by the Examiner
UNITED STATES PATENTS

| | | | |
|---|---|---|---|
| 1,745,173 | 1/30 | Leonard | 29—191 |
| 2,258,327 | 10/41 | Kramer | 29—191 |
| 2,429,320 | 10/47 | Kennedy | 148—127 |
| 2,564,391 | 8/51 | Burns | 148—127 |
| 2,705,627 | 4/55 | Norgaard | 148—127 |
| 2,946,119 | 7/60 | Jones et al. | 29—470 |
| 2,982,017 | 5/61 | Drummond | 29—470 |
| 2,985,954 | 5/61 | Jones et al. | 29—470.1 |
| 3,024,526 | 3/62 | Philipchuk et al. | 29—470.1 |
| 3,031,746 | 5/62 | Ciarleglio et al. | 29—470.1 |
| 3,036,374 | 5/62 | Williams | 29—470.1 |
| 3,106,013 | 10/63 | Rozmus | 29—470.1 |

DAVID L. RECK, *Primary Examiner.*

HYLAND BIZOT, *Examiner.*